(12) United States Patent
Yasuda et al.

(10) Patent No.: US 11,383,757 B2
(45) Date of Patent: Jul. 12, 2022

(54) SHAFT FOR STEERING DEVICE, METHOD OF MANUFACTURING SHAFT FOR STEERING DEVICE, AND ELECTRIC POWER STEERING DEVICE

(71) Applicant: NSK Ltd., Tokyo (JP)

(72) Inventors: Kaname Yasuda, Gunma (JP); Tatsuya Suehiro, Gunma (JP); Kazuya Yamada, Gunma (JP)

(73) Assignee: NSK LTD., Tokyo (JP)

( * ) Notice: Subject to any disclaimer, the term of this patent is extended or adjusted under 35 U.S.C. 154(b) by 447 days.

(21) Appl. No.: 16/609,774

(22) PCT Filed: Jun. 22, 2017

(86) PCT No.: PCT/JP2017/022991
§ 371 (c)(1),
(2) Date: Oct. 31, 2019

(87) PCT Pub. No.: WO2018/235222
PCT Pub. Date: Dec. 27, 2018

(65) Prior Publication Data
US 2020/0062291 A1    Feb. 27, 2020

(51) Int. Cl.
*B62D 1/20* (2006.01)
*B21K 1/06* (2006.01)
*B62D 5/04* (2006.01)

(52) U.S. Cl.
CPC .................. *B62D 1/20* (2013.01); *B21K 1/06* (2013.01); *B62D 5/0412* (2013.01)

(58) Field of Classification Search
CPC . B21K 1/06; B21K 1/066; B62D 1/16; B62D 1/20; B62D 5/0412
(Continued)

(56) References Cited

U.S. PATENT DOCUMENTS 7,484,759 B2    2/2009    Pattok et al.
8,101,031 B2 *  1/2012    Sakurai ...................... B21J 5/12
                                                             464/183
(Continued)

FOREIGN PATENT DOCUMENTS

GB    2 240 059 B      8/1993
JP    53-102946 U1     8/1978
(Continued)

OTHER PUBLICATIONS

Japanese Decision to Grant a Patent issued in JP 2016-048801 dated Jul. 10, 2019.
(Continued)

*Primary Examiner* — Minnah L Seoh
*Assistant Examiner* — Felicia L. Brittman
(74) *Attorney, Agent, or Firm* — Sughrue Mion, PLLC

(57) ABSTRACT

A shaft for a steering device has a first portion, a second portion, and a third portion that is a shaft integrated with the first portion and the second portion and couples the first portion and the second portion in a first direction. The outer diameter of the third portion is smaller than the length of the second portion in a second direction intersecting with the first direction, and is constant across a direction extending along the first direction. The hardness of the third portion is greater than the hardness of the second portion, and is constant across the direction extending along the first direction.

9 Claims, 10 Drawing Sheets

(58) Field of Classification Search
USPC .......................................................... 180/444
See application file for complete search history.

(56) References Cited

U.S. PATENT DOCUMENTS

| | | | |
|---|---|---|---|
| 9,975,163 B2 | 5/2018 | Sato | |
| 11,242,085 B2* | 2/2022 | Suehiro | .................... B62D 1/20 |
| 2007/0017313 A1 | 1/2007 | Pattok et al. | |

FOREIGN PATENT DOCUMENTS

| | | |
|---|---|---|
| JP | 03-189043 A | 8/1991 |
| JP | 08-197184 A | 8/1996 |
| JP | 2015-085805 A | 5/2015 |
| JP | 2017-039146 A | 2/2017 |
| WO | 2018/179928 A1 | 10/2018 |
| WO | 2018/179929 A1 | 10/2018 |

OTHER PUBLICATIONS

International Search Report of PCT/JP2017/022991 dated Aug. 8, 2017.

* cited by examiner

SHAFT FOR STEERING DEVICE, METHOD OF MANUFACTURING SHAFT FOR STEERING DEVICE, AND ELECTRIC POWER STEERING DEVICE

CROSS REFERENCE TO RELATED APPLICATIONS

This application is a National Stage of International Application No. PCT/JP2017/022991 filed Jun. 22, 2017.

FIELD

The present invention relates to a shaft for a steering device, a method of manufacturing a shaft for a steering device, and an electric power steering device.

BACKGROUND

A steering device for an automobile or the like includes for example a steering shaft and an intermediate shaft for communicating the steering torque input from a steering wheel to the wheels side. Patent Literature 1 discloses a middle shaft to be used in a steering column shaft in an electric power steering device.

The steering column shaft disclosed in Patent Literature 1 includes an upper shaft, a middle shaft, an input shaft, and an output shaft. These component members are connected to one another via spline-coupling or press-fitting. The middle shaft of the steering column shaft has a tapered smaller-diameter portion, and when a torque equal to or greater than a reference torque is input, the entire smaller diameter portion becomes plastically deformed, so that an impact energy absorption characteristic is achieved thereby.

CITATION LIST

Patent Literature

Patent Literature 1: Japanese Laid-open Patent Publication No. 2015-85805 A

SUMMARY

Technical Problem

In Patent Literature 1, because the steering column shaft includes many members, the number of the steps for joining the members is increased. Therefore, there is a possibility of production cost increase. Furthermore, the communication of the torque may be less reliable at the connection between the members.

An object of the present invention is to provide a shaft for a steering device, a method of manufacturing a shaft for a steering device, and an electric power steering device capable of reducing the number of members, and improving the reliability of the torque communication.

Solution to Problem

A shaft for a steering device according to one embodiment of the present invention includes a first portion, a second portion, and a third portion that is integrated with the first portion and the second portion, and that is a shaft coupling the first portion and the second portion in a first direction. An outer diameter of the third portion is smaller than a length of the second portion in a second direction intersecting with the first direction, and is constant across a direction extending along the first direction, and a hardness of the third portion is greater than a hardness of the second portion, and is constant in the direction extending along the first direction.

With such a structure, because the first portion, the second portion, and the third portion are integrated, the number of members is reduced. Because the number of steps for joining the members is also reduced, the production cost can be reduced, and the torque communication reliability can be improved. Furthermore, because the outer diameter and the hardness of the third portion are constant across the direction extending along the first direction, even when a torque equal to or greater than the reference torque is applied, the third portion becomes twisted and goes through a plastic deformation, and absorbs the impact energy. Hence, the impact energy can be absorbed appropriately.

In the shaft for a steering device according to one embodiment of the present invention, a leveled portion is provided between the third portion and the second portion, and the hardness of the third portion near the leveled portion is greater than the hardness of the second portion near the leveled portion. With such a structure, the hardness of the third portion is great near the leveled portion where the stress concentrates. Therefore, even when a torque equal to or greater than the reference torque is input, fractures at an early stage can be suppressed.

In the shaft for a steering device according to one embodiment of the present invention, the second portion includes a stopper portion that is to be coupled to an output shaft, and a large-diameter portion that is provided between the stopper portion and the third portion and has an outer diameter greater than that of the third portion, and the hardness of the third portion is greater than a hardness of the large-diameter portion. With such a structure, a larger outer diameter can be easily given to the large-diameter portion than that given to the stopper portion to which the output shaft is coupled, and a larger outer diameter can be given to the large-diameter portion of the second portion than that given to the third portion.

In the shaft for a steering device according to one embodiment of the present invention, the third portion includes a small-diameter portion that is provided on a side of the first portion, and a middle-diameter portion that couples the small-diameter portion and the second portion, and that has an outer diameter smaller than that of the second portion, an outer diameter of the small-diameter portion is smaller than that of the middle-diameter portion, and is constant in a direction extending along the axial direction, and a hardness of the small-diameter portion is greater than the hardness of the second portion, and is constant in a direction extending along the axial direction. With such a structure, because the third portion includes the small-diameter portion and the middle-diameter portion, when torque is input, the small-diameter portion goes through a plastic deformation more easily. Therefore, it is possible to suppress concentration of the stress at the leveled portion between the third portion and the second portion.

In the shaft for a steering device according to one embodiment of the present invention, the second portion includes a stopper portion that is to be coupled to an output shaft, and a large-diameter portion that is provided between the stopper portion and the third portion and has an outer diameter greater than that of the third portion, and the hardness of the small-diameter portion is greater than the hardness of the large-diameter portion. With such a structure, a larger outer diameter can be easily given to the large-diameter portion than that given to the stopper portion to which the output shaft is coupled, and a larger outer diameter can be given to the large-diameter portion of the second portion than that given to the small-diameter portion of the third portion.

In the shaft for a steering device according to one embodiment of the present invention, the first portion and the second portion are a shaft having a longitudinal direction that extends along the first direction, and the first portion is to be coupled to an input shaft mounted on a side of a steering wheel. With such a structure, the number of members for communicating the torque of the input shaft to the output shaft can be reduced. Even when a torque equal to or greater than the reference torque is applied from the input shaft, the third portion becomes twisted and goes through a plastic deformation. Therefore, the impact energy is absorbed by the third portion.

In the shaft for a steering device according to one embodiment of the present invention, the second portion is a yoke that is to be connected to an output shaft or a pinion shaft generating an output torque, the first portion is a spline shaft portion provided with a spline groove, and the third portion is a shaft portion that is integrated with the yoke and the spline shaft portion and couples the yoke and the spline shaft portion.

With such a structure, the shaft for a steering device can be used as an upper shaft of the intermediate shaft. Because the yoke, the spline shaft, and the shaft portion are integrated, the step for joining the yoke and the shaft portion by welding or the like can for example be omitted, and therefore, the production cost can be reduced. Furthermore, because the outer diameter and the hardness of the shaft portion are constant across the direction extending along the axial direction, even when a torque equal to or greater than the reference torque is applied, the shaft portion becomes twisted and goes through a plastic deformation, and therefore, the impact energy is absorbed by the shaft portion.

A method of manufacturing a shaft for a steering device according to one embodiment of the present invention includes a step of forming a first blank portion and a second blank portion that has a diameter smaller than that of the first blank portion to form a processed hardened layer on the second blank portion, by swaging a material in a radial direction, and a step of pressing the first blank portion and the second blank portion of the material into a die in the axial direction using a press to integrally form a spline shaft portion, a large-diameter portion, and a middle shaft portion, the spline shaft portion being provided with a spline groove, the large-diameter portion being provided to an end of the material on an opposite side of the spline shaft portion, the middle shaft portion being provided between the spline shaft portion and the large-diameter portion and having an outer diameter being smaller than that of the large-diameter portion and constant in a direction extending along the axial direction.

With such a structure, because the material is pressed to a shape near the shape of the shaft for a steering device, it is possible to reduce the production cost by reducing the machining time. Furthermore, a processed hardened layer is formed on the middle shaft portion by swaging and pressing. In this manner, the hardness of the middle shaft portion is set greater than that of the large-diameter portion, and the processed hardened layer is kept constant across the axial direction.

The method of manufacturing a shaft for a steering device according to one embodiment of the present invention further includes a step of machining a leveled portion between the large-diameter portion and the middle shaft portion in the axial direction, while leaving part of the processed hardened layer. With such a structure, because the leveled portion between the middle shaft portion and the large-diameter portion is machined, the third portion having a constant hardness in the axial direction is provided. Therefore, the impact energy can be absorbed appropriately.

An electric power steering device according to one embodiment of the present invention includes the shaft for a steering device described above, an output shaft on which a decelerator rotated by a torque input from an electric motor is mounted, the output shaft being coupled to the second portion, and a torsion bar that couples the output shaft and the shaft for a steering device.

With such a structure, because the number of the members of the electric power steering device is reduced, the production cost can be reduced. Furthermore, even when a torque equal to or greater than the reference torque is applied, because the third portion becomes twisted and goes through a plastic deformation, the impact energy is absorbed by the third portion. Therefore, the impact energy can be absorbed appropriately.

Advantageous Effects of Invention

According to the present invention, the number of members can be reduced, and the torque communication reliability can be improved.

DESCRIPTION OF EMBODIMENTS

Some embodiments for implementing the present invention will now be explained in detail with reference to some drawings. The descriptions in the following embodiments are, however, not intended to limit the scope of the present invention in any way. Furthermore, the elements described below include those that can be easily thought of by those skilled in the art, and those that are substantially the same. Furthermore, the elements to be described below may be combined as appropriate.

First Embodiment

Figure 1:
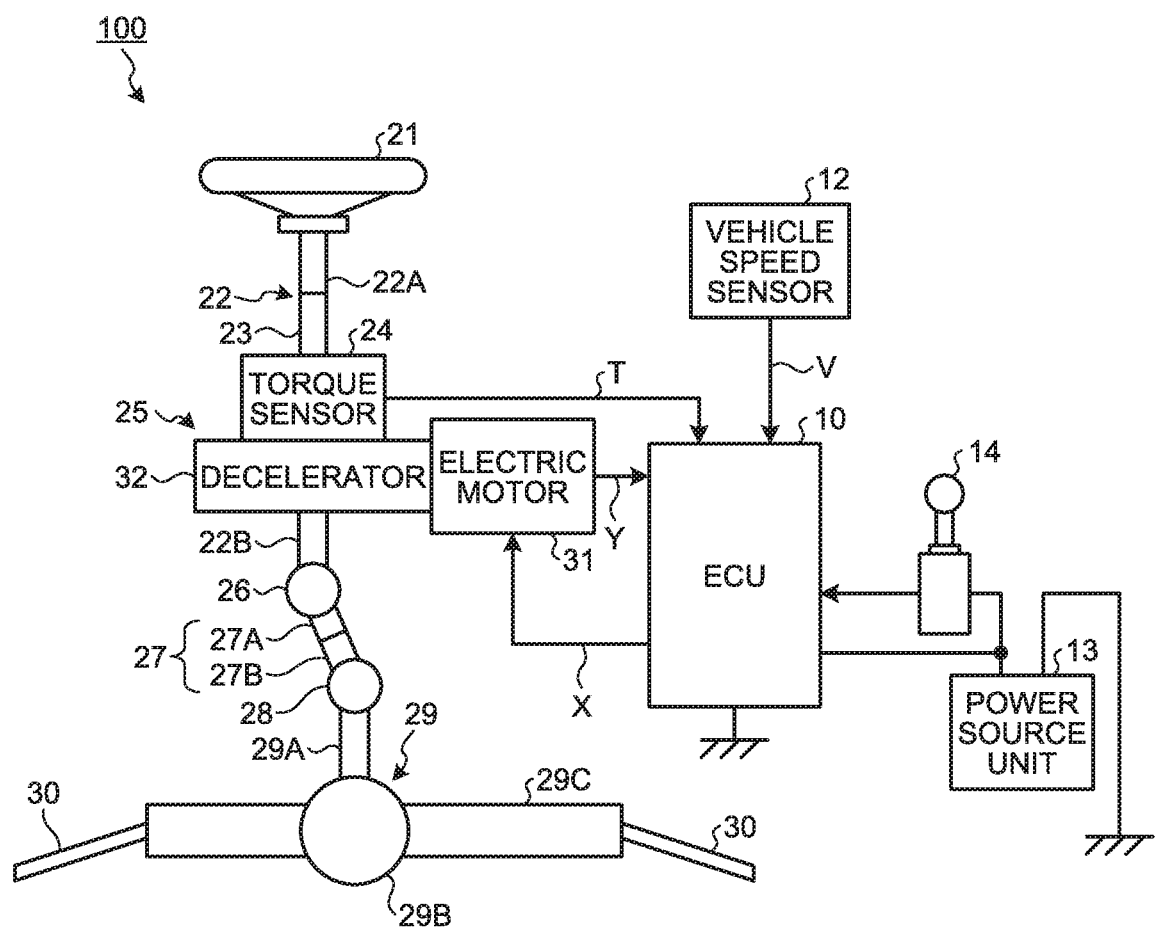
FIG. 1 is a schematic illustrating an example of a configuration of an electric power steering device including a steering shaft according to a first embodiment.
Figure 2:
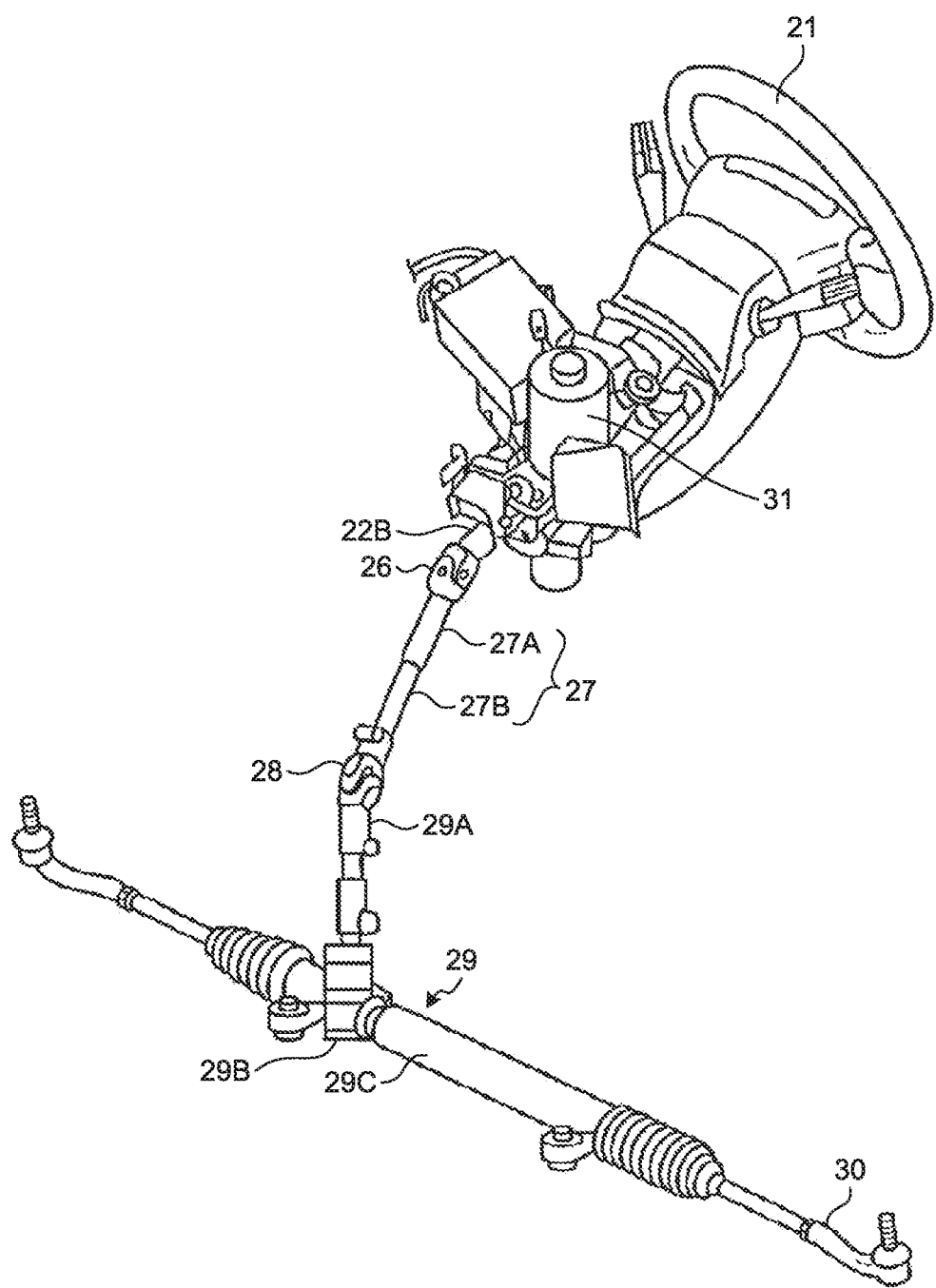
FIG. 2 is a schematic for explaining the electric power steering device including the steering shaft according to the first embodiment.

FIG. 1 is a schematic illustrating an example of a configuration of an electric power steering device including a steering shaft according to a first embodiment. FIG. 2 is a schematic for schematically explaining the electric power steering device including the steering shaft according to the first embodiment. The electric power steering device will now be explained briefly with reference to FIGS. 1 and 2.

This electric power steering device 100 includes, in the order in which the force applied by a driver (operator) is communicated, a steering wheel 21, a steering shaft 22, a torque sensor 24, an electric assist device 25, a universal joint 26, an intermediate shaft 27, a universal joint 28, a steering gear mechanism 29, and tie rods 30. The electric power steering device 100 is a column-assist electric power steering device. In other words, at least a part of the electric assist device 25 is supported by a steering column 41, which will be described later, and applies an assisting force to the steering shaft 22.

As illustrated in FIG. 1, the steering shaft 22 includes an input shaft 22A, an output shaft 22B, and a torque sensor shaft 23. One end of the input shaft 22A is connected to the steering wheel 21, and the other end is connected to the torque sensor shaft 23. The torque sensor shaft 23 is positioned between the input shaft 22A and the output shaft 22B. The torque sensor shaft 23 is connected to one end of the output shaft 22B via the torque sensor 24. A steering force applied to the steering wheel 21 causes the steering shaft 22 to rotate.

The torque sensor 24 detects a steering torque T on the steering shaft 22. The torque sensor 24 is connected to an ECU 10, and outputs the information of the detected steering torque T to the ECU 10.

The electric assist device 25 has an electric motor 31 and a decelerator 32. The electric motor 31 is an electric motor for generating an assisting steering torque for assisting the steering of the driver. The electric motor 31 may be a brushless motor or a motor having a brush and a commutator. The electric motor 31 is connected to the decelerator 32, and outputs the assisting steering torque to the decelerator 32. The decelerator 32 is connected to the output shaft 22B. The assisting steering torque input from the electric motor 31 causes the decelerator 32 to rotate, and the torque is communicated to the output shaft 22B.

The intermediate shaft 27 includes an upper shaft 27A and a lower shaft 27B. The upper shaft 27A is connected to the output shaft 22B via the universal joint 26. The lower shaft 27B is connected to a pinion shaft 29A included in the steering gear mechanism 29, via the universal joint 28. Because the upper shaft 27A and the lower shaft 27B are spline-coupled, the upper shaft 27A and the lower shaft 27B not only communicate the torque on the output shaft 22B, but also are relatively movable with respect to each other, in directions in parallel with a central axis. These relative movements of the upper shaft 27A and the lower shaft 27B in the axial direction allow the intermediate shaft 27 to extend and to contract.

The steering gear mechanism 29 has a rack-and-pinion mechanism, and includes the pinion shaft (input shaft) 29A, a pinion 29B, and a rack 29C. One end of the pinion shaft 29A is connected to the intermediate shaft 27, and the other end is connected to the pinion 29B. The rack 29C is meshed with the pinion 29B. The rotational movement of the steering shaft 22 is communicated to the steering gear mechanism 29 via the intermediate shaft 27. This rotational movement is converted into a linear movement by the rack 29C. The tie rods 30 are connected to the rack 29C.

The vehicle (not illustrated) having the electric power steering device 100 onboard is provided with the electronic control unit (ECU) 10, a vehicle speed sensor 12, a power source unit 13, and an ignition switch 14, for example, illustrated in FIG. 1. The ECU 10 provided to the vehicle controls the electric power steering device 100. One example of the power source unit 13 is an onboard battery unit, and is connected to the ECU 10. When the ignition switch 14 is switched on, the power is supplied from the power source unit 13 to the ECU 10.

The vehicle speed sensor 12 detects a running speed of the vehicle. The vehicle speed sensor 12 is connected to the ECU 10. A vehicle speed signal V detected by the vehicle speed sensor 12 is output to the ECU 10.

The ECU 10 acquires a steering torque T from the torque sensor 24, and the vehicle speed signal V of the vehicle from the vehicle speed sensor 12. The ECU 10 then calculates, for an assist instruction, an assisting steering instruction value based on the steering torque T and the vehicle speed signal V. The ECU 10 outputs a control signal X to the electric motor 31, based on the calculated assisting steering instruction value. The ECU 10 also acquires information of an induced voltage or rotation information of a rotor from the electric motor 31, as operation information Y.

The steering force applied by the driver to the steering wheel 21 is communicated to the decelerator 32 in the electric assist device 25 via the input shaft 22A. At this time, the ECU 10 acquires the steering torque T input to the input shaft 22A, from the torque sensor 24. The ECU 10 acquires the vehicle speed signal V from the vehicle speed sensor 12. The ECU 10 controls the operation of the electric motor 31 by outputting the control signal X. The assisting steering torque generated by the electric motor 31 is communicated to the decelerator 32. The decelerator 32 then applies the assisting steering torque to the output shaft 22B. The output shaft 22B outputs the torque resultant of adding the assisting steering torque communicated from the electric motor 31 to the steering torque of the steering wheel 21. In this manner, the electric power steering device 100 assists the driver's steering of the steering wheel 21.

Figure 3:
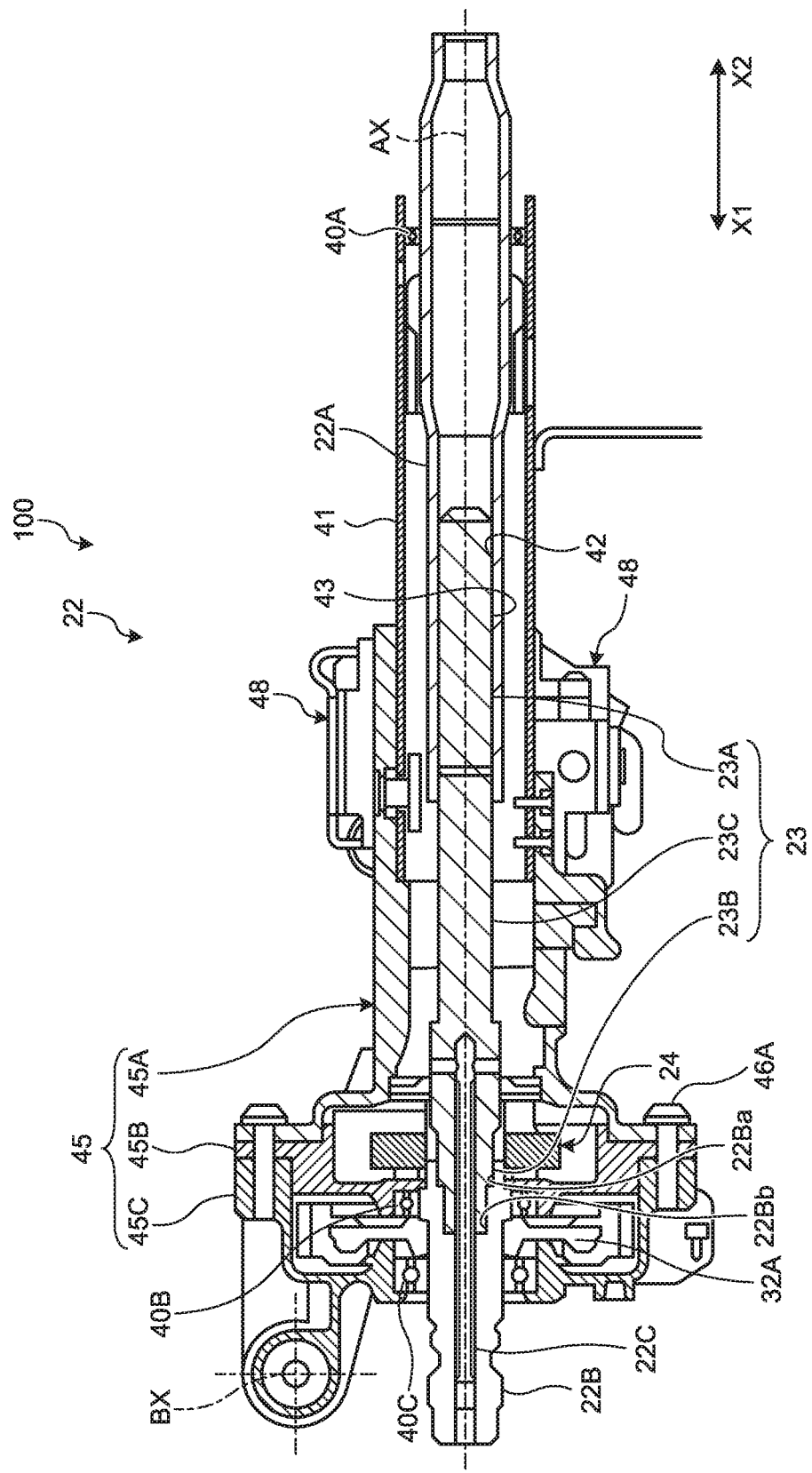
FIG. 3 is a sectional side view of the steering shaft according to the first embodiment.

A structure of the steering shaft 22 will now be explained with reference to FIG. 3. FIG. 3 is a sectional side view of the steering shaft according to the first embodiment. In FIG. 3, among the directions extending along the central axis AX of the steering shaft 22, the direction directed toward the intermediate shaft 27 (see FIG. 1) will be referred to as a direction X1, and the direction directed toward the steering wheel 21 (see FIG. 1) will be referred to as a direction X2.

The electric power steering device 100 includes the steering shaft 22, the steering column 41 that is a tubular member, a housing 45 positioned on the side of the steering column 41 in the direction X1, and a torsion bar 22C. The steering column 41 is fixed to a body-mounting bracket 48 with a clamping mechanism, and is mounted on the body with the body-mounting bracket 48.

At least a part of the steering shaft 22 is placed inside of the steering column 41. In this embodiment, the input shaft 22A and a part of the torque sensor shaft 23 are placed inside of the steering column 41. A part of the torque sensor shaft 23 on the side of the direction X1 and the output shaft 22B extend further than the steering column 41 in the direction X1. A bearing 40A is provided on the inner circumferential surface of the steering column 41. The bearing 40A supports the input shaft 22A rotatably. A rolling bearing capable of supporting a radial load and a thrust load may be used as the bearing 40A.

The torque sensor shaft 23 has a first shaft portion 23A, a second shaft portion 23B, and a third shaft portion 23C. The first shaft portion 23A is provided with a male spline 43 on the outer circumference thereof. The male spline 43 is meshed with a female spline 42 provided on the inner circumference of the input shaft 22A, and the torque applied to the input shaft 22A is communicated to the first shaft portion 23A. The first shaft portion 23A is relatively movable in the axial direction with respect to the input shaft 22A. The second shaft portion 23B is meshed with the output shaft 22B.

The third shaft portion 23C extends coaxially with the first shaft portion 23A and the second shaft portion 23B in a direction extending along the central axis AX, and couples the first shaft portion 23A to the second shaft portion 23B. The third shaft portion 23C has an outer diameter that is smaller than that of the second shaft portion 23B. With such a structure, the torque applied to the input shaft 22A is communicated to the output shaft 22B via the torque sensor shaft 23. Here, the torque sensor shaft 23 corresponds to one specific example of the "shaft for a steering device" according to the present invention.

The torsion bar 22C couples the output shaft 22B to the torque sensor shaft 23. Depending on the size of the steering torque input to the torque sensor shaft 23, a torsional moment is generated in the torsion bar 22C. The output shaft 22B, being displaced relatively to the torque sensor shaft 23 in the rotating direction, is rotated by the torsional moment. The torque sensor 24 then detects the steering torque based on the amount of relative rotational displacement between the torque sensor shaft 23 and the output shaft 22B.

The housing 45 is positioned on the outer circumference of the output shaft 22B and the second shaft portion 23B, on the side further than the steering column 41 in the direction X1. The housing 45 is made of a material with a high thermal conductivity. The housing 45 is made of, for example, at least one of aluminum, aluminum alloy, magnesium, and magnesium alloy. The housing 45 is manufactured through die-casting, for example.

The housing 45 includes a first housing 45A, a second housing 45B, and a third housing 45C. The first housing 45A, the second housing 45B, and the third housing 45C are positioned in the order listed herein, from the side of the direction X2 toward the direction X1. The first housing 45A is a tubular member. The third shaft portion 23C is positioned inside of the first housing 45A. The end of the first housing 45A in the direction X2 is positioned in a manner overlapping with the steering column 41, and is fixed to the steering column 41 via fixing members 46B, 46C. The first housing 45A is fixed to the second housing 45B and the third housing 45C via a fixing member 46A. The first housing 45A may also be integrated with the steering column 41. It is also possible for the first housing 45A, the second housing 45B, and the third housing 45C to be integrated.

The second housing 45B is provided to the outer circumference of the third shaft portion 23C and the output shaft 22B. The torque sensor 24 described above is positioned in the internal space surrounded by the first housing 45A and the second housing 45B. The third housing 45C is provided to the outer circumference of the output shaft 22B. A worm wheel 32A of the decelerator 32 described above is provided in the internal space surrounded by the second housing 45B and the third housing 45C. The worm wheel 32A is connected to the output shaft of the electric motor 31 (see FIG. 1) via a worm (not illustrated), and communicates the assisting steering torque of the electric motor 31 to the output shaft 22B.

A bearing 40B is provided to the inner circumferential surface of the second housing 45B, and a bearing 40C is provided on the inner circumferential surface of the third housing 45C. The bearing 40B and the bearing 40C hold the output shaft 22B rotatably. A tilt mechanism (not illustrated), for example, is connected to the third housing 45C of the housing 45, and may be configured rotatable about a tilt axis BX. This structure enables the angle of the central axis AX of the steering shaft 22 to be changed, and enables the clamping mechanism to adjust the position of the steering wheel 21 in the up-and-down direction.

Figure 4:
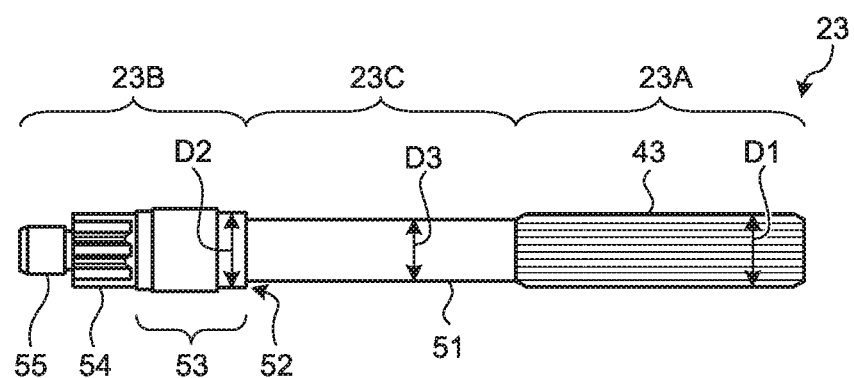
FIG. 4 is a side view of a torque sensor shaft according to the first embodiment.

A structure of the torque sensor shaft 23 will now be explained with reference to FIG. 4. FIG. 4 is a side view of the torque sensor shaft according to the first embodiment. As illustrated in FIG. 4, the torque sensor shaft 23 has the first shaft portion 23A, the second shaft portion 23B, and the third shaft portion 23C.

The first shaft portion 23A is provided with the male spline 43 that is meshed with the input shaft 22A, as described above. The second shaft portion 23B is positioned on the side of the output shaft 22B. The second shaft portion 23B has a large-diameter portion 53, a sensor stopper portion 54, and a cylindrical portion 55. The cylindrical portion 55 is engaged with a second cylindrical portion 22Bb of the output shaft 22B (see FIG. 3) via the bearing. In this manner, the concentricity of the output shaft 22B and the second shaft portion 23B is ensured.

A plurality of teeth are provided to the outer circumference of the sensor stopper portion 54, along the circumferential direction. The output shaft 22B has a first cylindrical portion 22Ba (see FIG. 3) that is positioned further than the second cylindrical portion 22Bb in the direction X2. A plurality of teeth are provided to the inner circumferential surface of the first cylindrical portion 22Ba, in the circumferential direction. The teeth of the sensor stopper portion 54 interlock with the teeth of the first cylindrical portion 22Ba, with a gap ensured therebetween in the circumferential direction. As illustrated in FIG. 3, the torsion bar 22C joins the output shaft 22B and the torque sensor shaft 23. When a large torque is input to the torque sensor shaft 23, the teeth of the sensor stopper portion 54 are brought into abutment with the teeth of the first cylindrical portion 22Ba, and the large torque can be communicated thereby. The large-diameter portion 53 has an outer diameter larger than those of the sensor stopper portion 54 and the cylindrical portion 55.

The third shaft portion 23C is provided between the first shaft portion 23A and the second shaft portion 23B, and couples the first shaft portion 23A to the second shaft portion 23B. In this embodiment, the first shaft portion 23A, the second shaft portion 23B, and the third shaft portion 23C are integrated, and the second shaft portion 23B is connected to the output shaft 22B. In other words, the second shaft portion 23B also has a function of the input shaft, which has conventionally been provided separately from the torque sensor shaft 23, and been meshed with the output shaft. Therefore, the number of members included in the torque sensor shaft 23 can be reduced. Furthermore, because the number of steps for joining the members is reduced, the production cost can be reduced, and the torque communication reliability can be improved.

The third shaft portion 23C has a shape of a right cylinder, and has a constant outer diameter D3 in a direction extending along the axial direction. The outer diameter D3 of the third shaft portion 23C is smaller than the outer diameter D2 of the large-diameter portion 53 of the second shaft portion 23B. The outer diameter D3 of the third shaft portion 23C is also smaller than the outer diameter D1 of the first shaft portion 23A. The outer diameter D1 of the first shaft portion 23A is set to an outer diameter of a circle connecting the protrusions of the male spline 43 in the circumferential direction. In the second shaft portion 23B, the outer diameter D2 of the large-diameter portion 53 represents the outer diameter of the large-diameter portion 53 near a leveled portion 52 between the second shaft portion 23B and the third shaft portion 23C.

A processed hardened layer 51 formed by swaging and pressing, as will be described later, is provided to substantially the entire third shaft portion 23C in the axial direction and the circumferential direction. The processed hardened layer 51 is, by contrast, not provided to the second shaft portion 23B. Even when the processed hardened layer 51 is provided to the second shaft portion 23B, the hardness of the processed hardened layer 51 on the second shaft portion 23B is less than that of the third shaft portion 23C. The hardness of the third shaft portion 23C remains constant across the direction extending along the axial direction, from near the boundary between the third shaft portion 23C and the first shaft portion 23A to near the boundary between the third shaft portion 23C and the second shaft portion 23B, and is greater than the hardness of the second shaft portion 23B. The hardness of the third shaft portion 23C near the leveled portion 52 between the second shaft portion 23B and the third shaft portion 23C is set greater than that of the second shaft portion 23B. The hardness is represented as a measurement of the hardness on the outer circumference of the corresponding shaft portion, and is a measurement collected using a method such as a Vickers hardness test or a Rockwell hardness test. In the description herein, a "constant outer diameter" or a "constant hardness" used represents not only the outer diameter or the hardness being constant at any point of the axial direction, but also may include a measurement within some allowance, e.g., having some error introduced during the manufacturing process, for example.

In the manner described above, the outer diameter and the hardness of the third shaft portion 23C are constant across the direction extending along the axial direction. Therefore, even when a torque equal to or greater than the reference torque is applied, the third shaft portion 23C can exhibit an excellent impact energy absorbing performance by absorbing the impact energy by becoming twisted and plastically deformed. Furthermore, because the hardness of the third shaft portion 23C near the leveled portion 52 where the stress concentrates is set greater than that of the second shaft portion 23B, even when a torque equal to or greater than the reference torque is input, fractures at an early stage can be suppressed.

As explained above, the torque sensor shaft 23 according to this embodiment includes the first shaft portion 23A (first portion), the second shaft portion 23B (second portion), and the third shaft portion 23C (third portion). The first shaft portion 23A is coupled to the input shaft 22A that is attached to the side of the steering wheel 21. The second shaft portion 23B is coupled to the output shaft 22B that generates an output torque. The third shaft portion 23C is integrated with the first shaft portion 23A and the second shaft portion 23B, and couples the first shaft portion 23A to the second shaft portion 23B in the axial direction (first direction). The outer diameter (the length in a second direction intersecting with the first direction) of the third shaft portion 23C is set smaller than that of the second shaft portion 23B, and kept constant across the direction extending along the axial direction. The hardness of the third shaft portion 23C is set greater than that of the second shaft portion 23B, and kept constant across the direction extending along the axial direction.

With such a structure, because the first shaft portion 23A, the second shaft portion 23B, and the third shaft portion 23C are integrated, and the second shaft portion 23B is connected to the output shaft 22B, the number of members is reduced. Furthermore, because the number of steps for joining the members is reduced, the production cost can be reduced, and the torque communication reliability can be improved. Moreover, because the outer diameter and the hardness of the third shaft portion 23C are kept constant across the direction extending along the axial direction, even when a torque equal to or greater than the reference torque is applied, the third shaft portion 23C becomes twisted and goes through a plastic deformation. In this manner, the third shaft portion 23C absorbs the impact energy, and therefore, the impact energy can be absorbed appropriately, and the torque communication reliability can be improved.

In the torque sensor shaft 23 according to this embodiment, the leveled portion 52 is formed between the third shaft portion 23C and the second shaft portion 23B. The hardness of the third shaft portion 23C near the leveled portion 52 is set greater than the hardness of the second shaft portion 23B near the leveled portion 52. With such a structure, because the hardness of the third shaft portion 23C is greater near the leveled portion 52 where the stress concentrates, fractures at an early stage can be suppressed, even when a torque equal to or greater than the reference torque is input.

In the torque sensor shaft 23 according to this embodiment, the second shaft portion 23B includes the sensor stopper portion 54 and the large-diameter portion 53. The sensor stopper portion 54 is coupled to the output shaft 22B. The large-diameter portion 53 is provided between the sensor stopper portion 54 and the third shaft portion 23C, and has an outer diameter greater than that of the third shaft portion 23C. The hardness of the third shaft portion 23C is set greater than the hardness of the large-diameter portion 53. With such a structure, a larger outer diameter can be easily given to the large-diameter portion 53 than that given to the sensor stopper portion 54 that is coupled to the output shaft 22B, and a larger diameter can be easily given to the outer diameter of the second shaft portion 23B than that given to the third shaft portion 23C. Even when a change in the diameter of the output shaft 22B is to be implemented, only required is to change the sensor stopper portion 54, and changes in the outer diameter D2 of the large-diameter portion 53 can be suppressed.

The electric power steering device 100 according to this embodiment is provided with the torque sensor shaft 23, the output shaft 22B, and the torsion bar 22C. The output shaft 22B is coupled to the second shaft portion 23B, and the decelerator 32 that is rotated by the torque input from the electric motor 31 is mounted on the output shaft 22B. The torsion bar 22C couples the output shaft 22B to the torque sensor shaft 23. With such a structure, because the number of members in the electric power steering device 100 is reduced, the production cost can be reduced. Furthermore, even when a torque equal to or greater than the reference torque is applied, the third shaft portion 23C can exhibit an excellent impact energy absorbing performance by absorbing the impact energy by becoming twisted and plastically deformed. Therefore, the torque communication reliability can be improved.

(Manufacturing Method)

Figure 5:
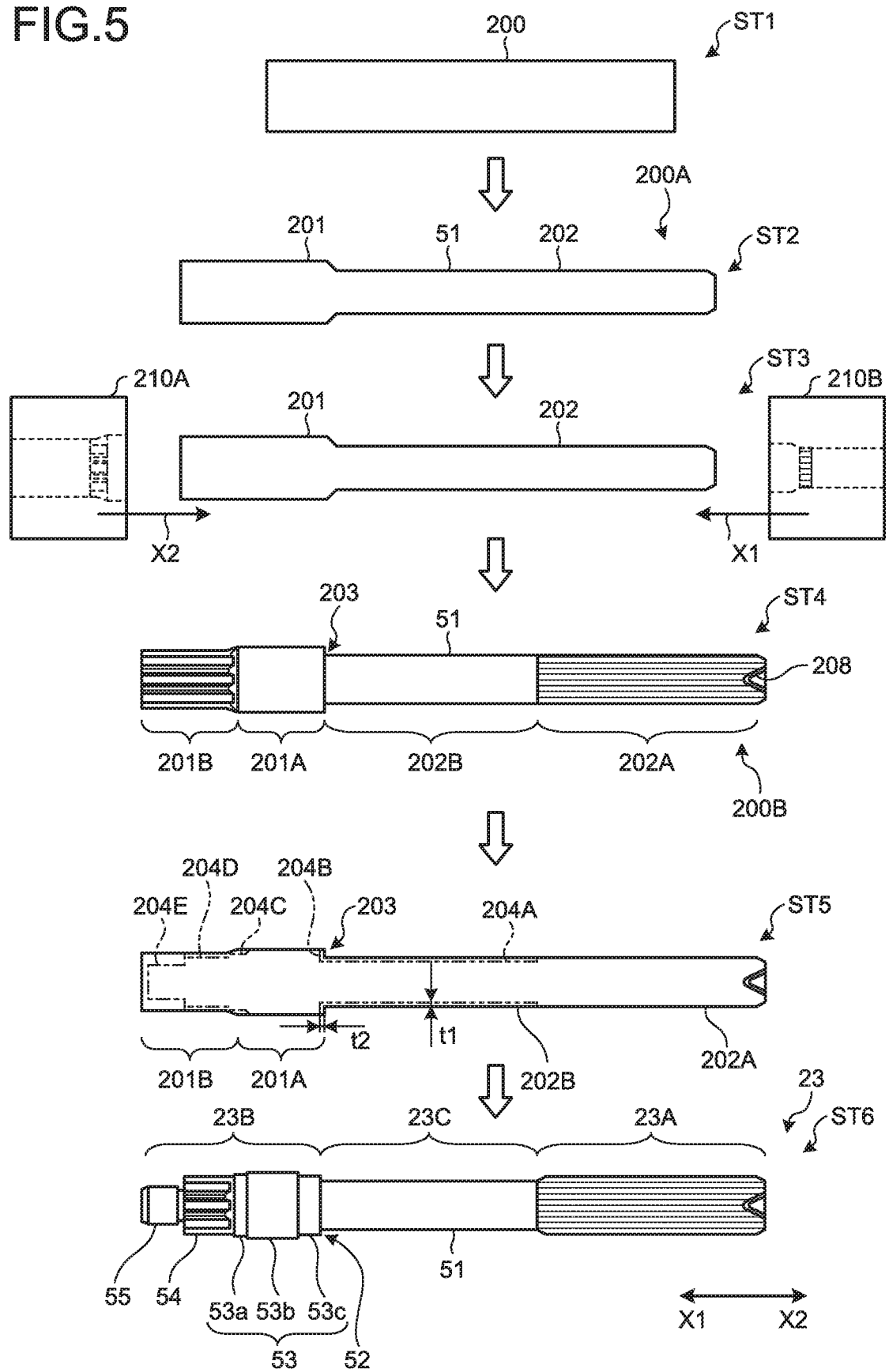
FIG. 5 is an explanatory schematic for explaining a process of manufacturing the torque sensor shaft.
Figure 6:
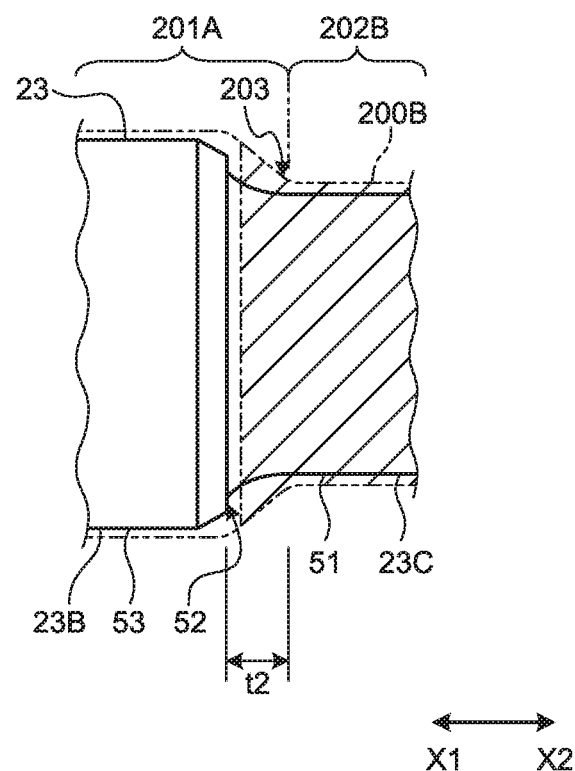
FIG. 6 is a schematic cross-sectional view for explaining process of machining a leveled portion between a large-diameter portion and a middle shaft portion.

FIG. 5 is an explanatory schematic for explaining a process of manufacturing the torque sensor shaft. FIG. 6 is a schematic cross-sectional view for explaining process of machining the leveled portion between the large-diameter portion and a middle shaft portion. As illustrated in FIG. 5, to begin with, a blank (material shaft) 200 is prepared (Step ST1). The blank 200 is a circular rod metal material, for example. The blank 200 is then swaged (Step ST2). In this manner, a blank 200A having a first blank portion 201 and a second blank portion 202 that has an outer diameter smaller than that of the first blank portion 201 is formed. The diameter of the second blank portion 202 is smaller than that of the not-swaged blank 200 by 20% or more and 30% or less, for example. In this manner, the processed hardened layer 51 is formed on the second blank portion 202. The first blank portion 201 is a portion where the second shaft portion 23B is to be formed, and the second blank portion 202 is a portion where the first shaft portion 23A and the third shaft portion 23C are to be formed. The blank 200A is swaged in such a manner that the diameter of the blank 200A becomes smaller and the axial length becomes longer than those of the not-swaged blank 200.

The blank 200A is then pressed (Step ST3). In one run of the pressing, a die 210A is pressed onto the first blank portion 201 of the blank 200A in the direction X2. In another run of the pressing, a die 210B is pressed onto the second blank portion 202 in the direction X1. It is also possible to press the first blank portion 201 and the second blank portion 202 at the same time in the same run.

As a result of the pressing, a forging 200B having a shape near the shape of the torque sensor shaft 23 is formed (Step ST4). The forging 200B has a large-diameter portion 201A, a stopper portion 201B, a middle shaft portion 202B, and a spline shaft portion 202A. The large-diameter portion 201A is a portion where the large-diameter portion 53 of the second shaft portion 23B is to be formed. The stopper portion 201B is a portion where the sensor stopper portion 54 and the cylindrical portion 55 of the second shaft portion 23B are to be formed. The middle shaft portion 202B is a portion where the third shaft portion 23C is to be formed. The spline shaft portion 202A is a portion where the first shaft portion 23A is to be formed. A recessed portion 208 serving as a reference axis during the machining is provided to an end of the spline shaft portion 202A in the direction X2.

Through the process of swaging and pressing described above, the processed hardened layer 51 has been formed on the middle shaft portion 202B. The large-diameter portion 201A is a portion having gone through a small amount of deformation in the radial direction during the pressing, and therefore, the processed hardened layer 51 has not been formed on the large-diameter portion 201A. Even when the processed hardened layer has been formed on the large-diameter portion 201A, the hardness of the processed hardened layer having formed is less than that of the processed hardened layer 51.

The forging 200B is then machined (Step ST5). At Step ST5, the machined outer shape is illustrated with a long dashed double-short dashed line. The outer diameter of the middle shaft portion 202B is machined by a thickness t1 to achieve the shape of a first machined portion 204A. The thickness t1 by which the middle shaft portion 202B is machined is 10% or more and 20% or less or so of the diameter of the not-machined middle shaft portion 202B. As a result, 60% or more and 70% or less or so of the processed hardened layer 51 remains unmachined, compared with the diameter of the machined middle shaft portion 202B. A leveled portion 203 between the middle shaft portion 202B and the large-diameter portion 201A is machined by a length t2 in the direction X1, into the shape of a second machined portion 204B. In other words, as a result of machining, the length of the middle shaft portion 202B in the axial direction becomes longer by the length t2 by which the machining is applied, and the length of the large-diameter portion 201A in the axial direction becomes shorter at least by the length t2 by which the machining is applied.

As illustrated in FIG. 6, the processed hardened layer 51 of the forging 200B extends further to the portion in the direction X1 than the leveled portion 203 between the middle shaft portion 202B and the large-diameter portion 201A. In FIG. 6, the pressed forging 200B is illustrated with long dashed double-short dashed lines, and the machined second shaft portion 23B and the machined third shaft portion 23C is illustrated with solid lines. In FIG. 6, the portion where the processed hardened layer 51 is formed is illustrated as hatched. Because the leveled portion 203 is machined by the length t2 in the direction X1, the third shaft portion 23C of the torque sensor shaft 23 has the processed hardened layer 51, but there is no processed hardened layer 51 remaining on the large-diameter portion 53. In this manner, the processed hardened layer 51 of the third shaft portion 23C is provided near the leveled portion 52 between the second shaft portion 23B and the third shaft portion 23C.

As illustrated at Step ST5 in FIG. 5, the large-diameter portion 201A and the stopper portion 201B are then machined to the shape of a third machined portion 204C, a fourth machined portion 204D, and a fifth machined portion 204E. The stopper portion 201B is processed into the cylindrical portion 55 and the sensor stopper portion 54, and the large-diameter portion 201A is processed into the shape of the large-diameter portion 53. The large-diameter portion 53 includes a first portion 53a that meets with the sensor stopper portion 54, a second portion 53b that has a greater diameter than the first portion 53a, and a third portion 53c that couples the second portion 53b to the third shaft portion 23C. In the manner described above, the torque sensor shaft 23 is manufactured (Step ST6).

As explained above, the method of manufacturing the torque sensor shaft 23 according to this embodiment includes pressing the blank 200 into the dies 210A, 210B in the axial direction using a press, and forming the spline shaft portion 202A, the large-diameter portion 201A, and the middle shaft portion 202B as an integration. The spline shaft portion 202A is provided with spline grooves. The large-diameter portion 201A is formed on an end on the opposite side of the spline shaft portion 202A. The middle shaft portion 202B is provided between the spline shaft portion 202A and the large-diameter portion 201A, has an outer diameter that is smaller than that of the large-diameter portion 201A and constant in the direction extending along the axial direction.

With such a structure, because the blank 200 is pressed into a shape near the shape of the torque sensor shaft 23, the time of machining can be reduced, so that the production cost can be reduced. Furthermore, the processed hardened layer 51 is formed on the middle shaft portion 202B by swaging and pressing the blank 200. In this manner, the hardness of the middle shaft portion 202B is set greater than that of the large-diameter portion 201A, and kept constant across the axial direction.

The method of manufacturing the torque sensor shaft 23 according to this embodiment includes machining the leveled portion 203 between the large-diameter portion 201A and the middle shaft portion 202B in the axial direction. With such a structure, because the leveled portion 203 between the middle shaft portion 202B and the large-diameter portion 201A is machined, the third shaft portion 23C having a constant hardness in the axial direction is achieved. Therefore, the impact energy can be absorbed appropriately.

Second Embodiment

Figure 7:
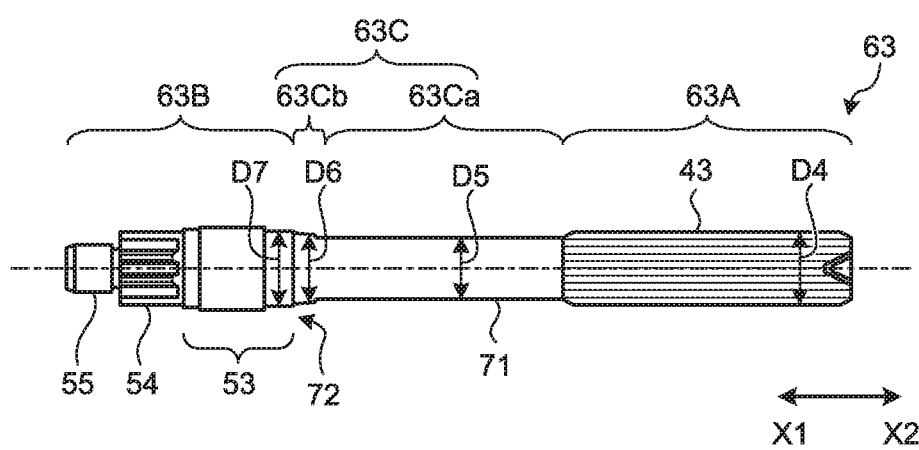
FIG. 7 is a side view of a torque sensor shaft according to a second embodiment.

FIG. 7 is a side view of a torque sensor shaft according to a second embodiment. This torque sensor shaft 63 according to the embodiment includes a first shaft portion 63A, a second shaft portion 63B, and a third shaft portion 63C. The structures of the first shaft portion 63A and the second shaft portion 63B are the same as those according to the first embodiment. The second shaft portion 63B has the large-diameter portion 53, the sensor stopper portion 54, and the cylindrical portion 55. The cylindrical portion 55 is engaged with the second cylindrical portion 22Bb of the output shaft 22B (see FIG. 3) via the bearing. The sensor stopper portion 54 interlocks with the inner circumferential surface of the first cylindrical portion 22Ba (see FIG. 3). The large-diameter portion 53 has an outer diameter greater than those of the sensor stopper portion 54 and the cylindrical portion 55. In this embodiment, the third shaft portion 63C has a small-diameter portion 63Ca and a middle-diameter portion 63Cb.

As illustrated in FIG. 7, the small-diameter portion 63Ca is connected to the first shaft portion 63A. The middle-diameter portion 63Cb couples the small-diameter portion 63Ca to the second shaft portion 63B. An outer diameter D6 of the middle-diameter portion 63Cb is larger than the outer diameter D5 of the small-diameter portion 63Ca, and is smaller than the outer diameter D7 of the large-diameter portion 53. The outer diameter D5 of the small-diameter portion 63Ca is smaller than the outer diameter D6 of the middle-diameter portion 63Cb, and is smaller than the outer diameter D4 of the first shaft portion 63A. The length of the small-diameter portion 63Ca in the axial direction is longer than that of the middle-diameter portion 63Cb. The small-diameter portion 63Ca has a processed hardened layer 71, and the hardness of the small-diameter portion 63Ca is set greater than that of the large-diameter portion 53, and kept constant across the direction extending along the axial direction, from near the boundary between the small-diameter portion 63Ca and the first shaft portion 63A to near the boundary between the small-diameter portion 63Ca and the middle-diameter portion 63Cb.

In this embodiment, because the small-diameter portion 63Ca has an outer diameter that is smaller than those of the large-diameter portion 53 and the middle-diameter portion 63Cb, the small-diameter portion 63Ca goes through a plastic deformation easily. Therefore, when a torque equal to or greater than the reference torque is applied to the torque sensor shaft 63, the small-diameter portion 63Ca of the third shaft portion 63C serves as an impact energy absorbing portion that absorbs the impact energy by becoming twisted and plastically deformed. Therefore, concentration of the stress at a leveled portion 72 between the second shaft portion 63B and the third shaft portion 63C is alleviated, and fractures at an early stage are suppressed.

Figure 8:
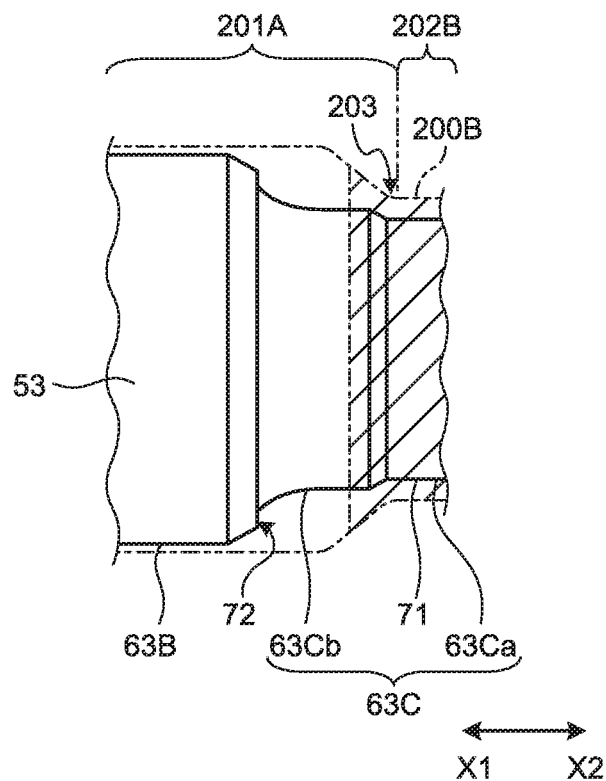
FIG. 8 is a schematic cross-sectional view for explaining a process of machining a leveled portion between a large-diameter portion and a middle shaft portion, in a process of manufacturing the torque sensor shaft according to the second embodiment.

FIG. 8 is a schematic cross-sectional view for explaining a process of machining the leveled portion between the large-diameter portion and the middle shaft portion, in the process of manufacturing the torque sensor shaft according to the second embodiment. In FIG. 8, the outer diameter of the pressed forging 200B is illustrated with long dashed double-short dashed lines, and the machined second shaft portion 63B and the machined third shaft portion 63C are illustrated with solid lines. In FIG. 8, the portion where the processed hardened layer 71 is formed is illustrated as hatched. In the method of manufacturing the torque sensor shaft 63, the forging 200B is pressed to a shape near the shape of the torque sensor shaft 63, and then is machined, in the same manner as Steps ST1 to ST4 in FIG. 5. As illustrated in FIG. 8, the processed hardened layer 71 is provided on the middle shaft portion 202B, and extends further to the portion in the direction X1 than the leveled portion 203 between the middle shaft portion 202B and the large-diameter portion 201A. In FIG. 8, the portion where the processed hardened layer 71 is formed is illustrated as hatched. The small-diameter portion 63Ca is then formed by machining the middle shaft portion 202B. The middle-diameter portion 63Cb between the small-diameter portion 63Ca and the large-diameter portion 53 is then formed by machining one end of the large-diameter portion 201A in the direction X2. A part of the middle-diameter portion 63Cb on the side of the direction X2 may have the processed hardened layer 71.

Through such a process, a part of the middle-diameter portion 63Cb near the leveled portion 72 between the second shaft portion 63B and the third shaft portion 63C does not have any remaining processed hardened layer 71. The processed hardened layer 71 is provided on the entire small-diameter portion 63Ca in the axial direction, and the small-diameter portion 63Ca has a constant hardness in the axial direction. The outer diameter of the small-diameter portion 63Ca is set smaller than those of the second shaft portion 63B and the middle-diameter portion 63Cb, and kept constant in the axial direction. Therefore, the small-diameter portion 63Ca goes through a plastic deformation more easily than the second shaft portion 63B and the middle-diameter portion 63Cb do. Therefore, the small-diameter portion 63Ca serves as an impact energy absorbing portion that absorbs the impact energy, and the torque communication reliability can be improved.

As explained above, the torque sensor shaft 63 according to this embodiment has the first shaft portion 63A, the second shaft portion 63B, and the third shaft portion 63C. The third shaft portion 63C includes the small-diameter portion 63Ca and the middle-diameter portion 63Cb. The small-diameter portion 63Ca is provided on the side of the first shaft portion 63A. The middle-diameter portion 63Cb couples the small-diameter portion 63Ca to the second shaft portion 63B, and has an outer diameter that is smaller than that of the second shaft portion 63B. The outer diameter of the small-diameter portion 63Ca is set smaller than that of the middle-diameter portion 63Cb, and kept constant across the direction extending along the axial direction. The hardness of the small-diameter portion 63Ca is set greater than that of the large-diameter portion 53 of the second shaft portion 63B, and kept constant across the direction extending along the axial direction.

EXAMPLES

Figure 9:
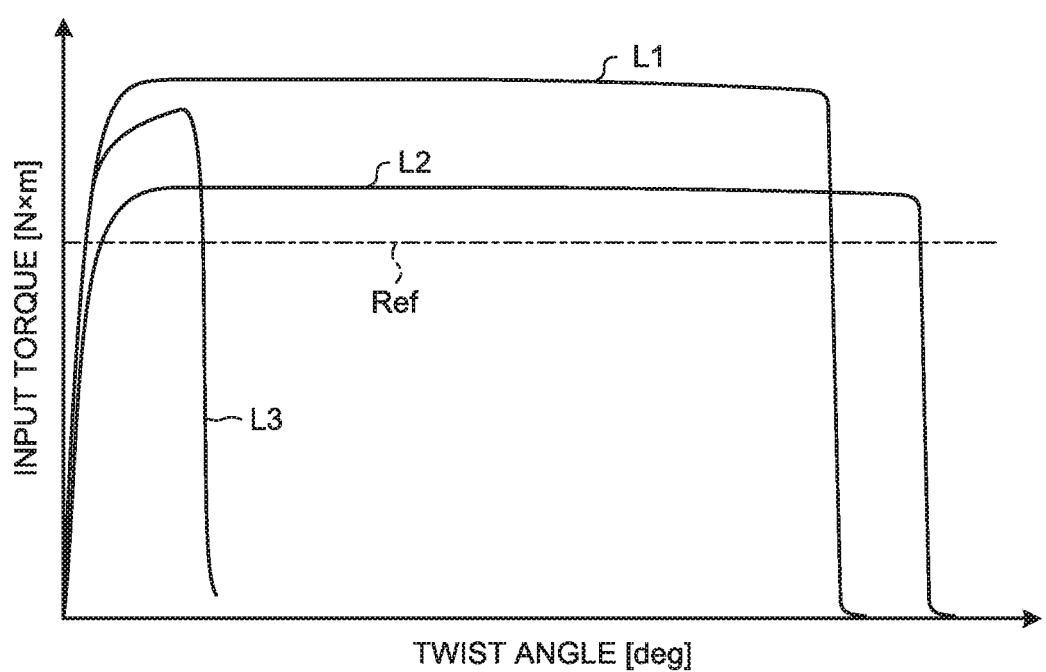
FIG. 9 is a graph illustrating a relation between input torque and twist angles of torque sensor shafts according to some examples.

FIG. 9 is a graph illustrating a relation between input torque and twist angles of torque sensor shafts according to some examples. The line L1 illustrated in FIG. 9 represents a torque sensor shaft according to a first example, and the line L2 represents a torque sensor shaft according to a second example. The line L3 represents a torque sensor shaft according to a comparative example. The long dashed short dashed line Ref represents a reference torque input to the torque sensor shafts. The reference torque was set to 400 (N×m), as an example.

The torque sensor shaft according to the first example has the same structure as the torque sensor shaft 23 according to the first embodiment. In this example, the Vickers hardness (Hv) of the large-diameter portion 53 of the second shaft portion 23B was equal to or greater than 140 and equal to or less than 180, e.g., 160, and the Vickers hardness (Hv) of the third shaft portion 23C was equal to or greater than 220 and equal to or less than 260, e.g., 240. The hardness was measured using a Vickers hardness test (JIS Z 2244) on the surface of each of these portions. The hardness may be measured using any other methods such as a Rockwell hardness test (JIS Z 2245), without limitation to the Vickers hardness test.

The torque sensor shaft according to the second example has the same structure as that of the torque sensor shaft 63 according to the second embodiment. In this example, the Vickers hardness (Hv) of the large-diameter portion 53 of the second shaft portion 63B was equal to or greater than 140 and equal to or less than 180, e.g., 160, and the Vickers hardness (Hv) of the middle-diameter portion 63Cb of the third shaft portion 63C was equal to or greater than 180 and equal to or less than 220, e.g., 200, and the Vickers hardness (Hv) of the small-diameter portion 63Ca of the third shaft portion 63C was equal to or greater than 220 and equal to or less than 260, e.g., 240.

Figure 10:
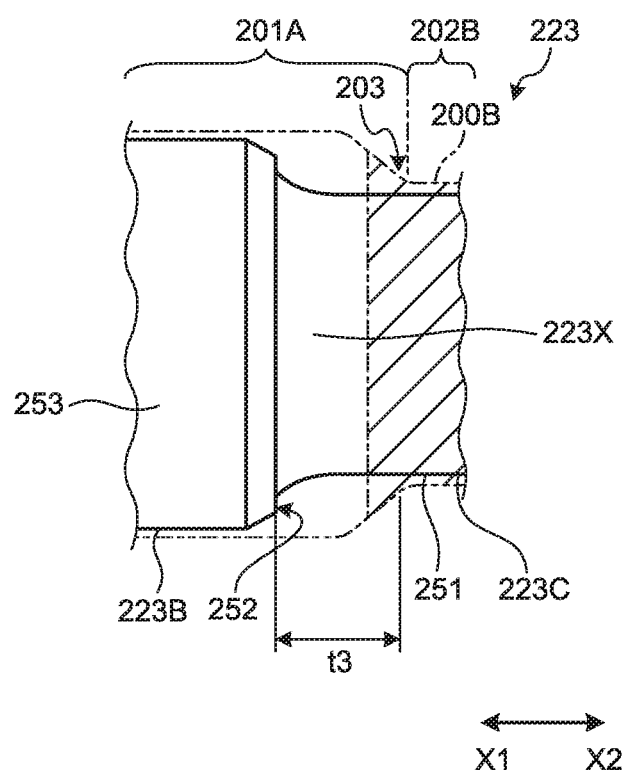
FIG. 10 is a schematic cross-sectional view for explaining a process of machining a leveled portion between a large-diameter portion and a middle shaft portion in a torque sensor shaft according to a comparative example.

FIG. 10 is a schematic cross-sectional view for explaining process of machining the leveled portion between the large-diameter portion and the middle shaft portion in the torque sensor shaft according to the comparative example. In FIG. 10, the outer diameter of the pressed forging 200B is illustrated with long dashed double-short dashed lines, and a machined second shaft portion 223B and a machined third shaft portion 223C are illustrated with solid lines. In FIG. 10, the portion provided with a processed hardened layer 251 is illustrated as hatched. In a torque sensor shaft 223 according to the comparative example, the processed hardened layer 251 was not provided near a leveled portion 252 between the second shaft portion 223B and the third shaft portion 223C. The outer diameter of a portion provided with the processed hardened layer 251 in the third shaft portion 223C was equal to the outer diameter of a portion 223X without the processed hardened layer 251. For the torque sensor shaft 223 according to the comparative example, during the machining of the forging 200B, the forging 200B was machined by a length t3 in the direction X1, from the leveled portion 203 between the middle shaft portion 202B and the large-diameter portion 201A. The machined length t3 was set approximately twice the length t2 illustrated in FIG. 6, for example.

In the comparative example, the Vickers hardness (Hv) of a large-diameter portion 253 of the second shaft portion 223B was equal to or greater than 140 and equal to or less than 180, e.g., 160, and the Vickers hardness (Hv) of the portion provided with the processed hardened layer 251 on the third shaft portion 223C was equal to or greater than 220 and equal to or less than 260, e.g., 240. The Vickers hardness (Hv) of the portion 223X not provided with the processed hardened layer 251 on the third shaft portion 223C was equal to or greater than 180 and equal to or less than 220, e.g., 200.

As illustrated in FIG. 9, because, in the torque sensor shaft 223 according to the comparative example, the processed hardened layer 251 was not provided near the leveled portion 252, when a torque equal to or greater than the reference torque was input, the stress concentrated at the leveled portion 252, and the third shaft portion 223C fractured at an early stage, before the third shaft portion 223C became plastically deformed and twisted.

By contrast, in the torque sensor shaft 23 according to the first example, because the processed hardened layer 51 was provided near the leveled portion 52, even when an input torque greater than that applied in the comparative example was input, the torque sensor shaft 23 did not fracture, and the third shaft portion 23C plastically deformed to a large torsion angle. Based on above, the torque sensor shaft 23 was proven to have a higher impact energy absorbing capacity, and improved torque communication reliability.

The torque sensor shaft 63 according to the second example had the small-diameter portion 63Ca with a smaller outer diameter, and therefore, the maximum torque was smaller than those according to the first example and the comparative example. However, because the small-diameter portion 63Ca was configured to go through a plastic deformation more easily, the small-diameter portion 63Ca plastically deformed to a torsion angle that was greater than those according to the first embodiment and the comparative example. Therefore, the torque sensor shaft 63 according to the second example, too, was proven to have a higher impact energy absorbing capacity, and improved torque communication reliability.

Third Embodiment

Figure 11:
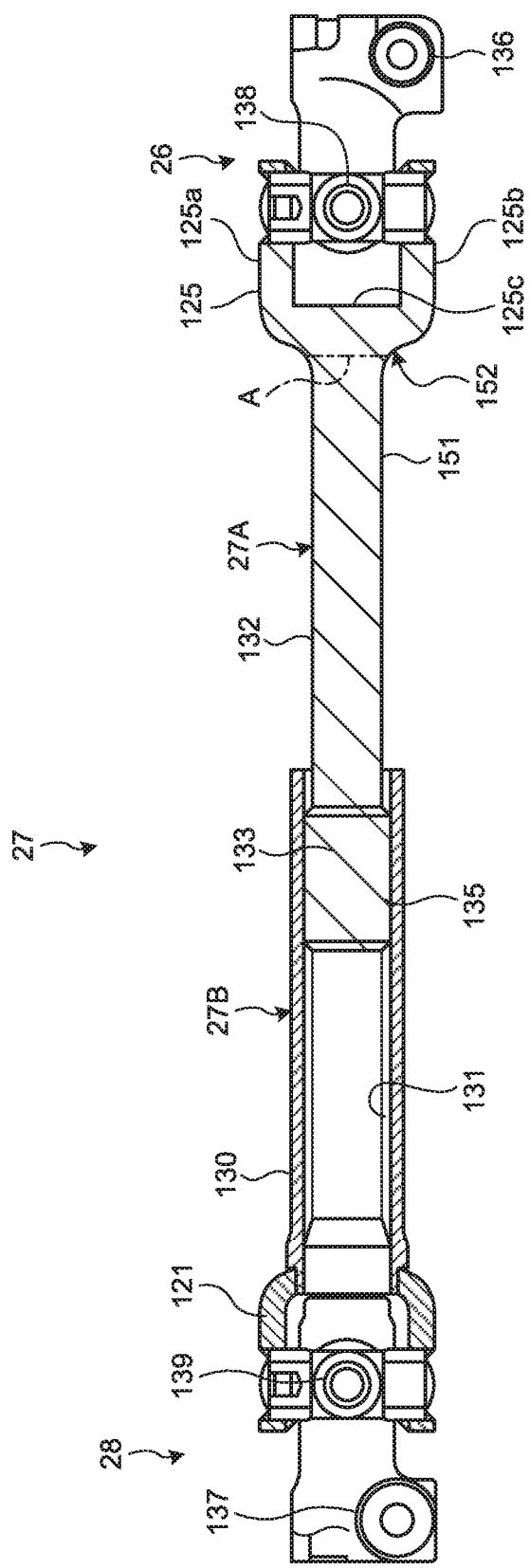
FIG. 11 is a schematic cross-sectional view of an intermediate shaft according to a third embodiment.
Figure 12:
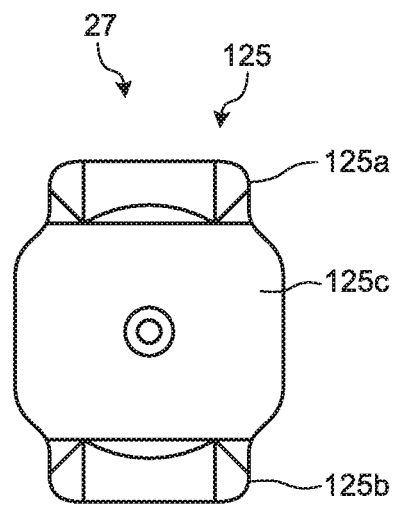
FIG. 12 is a side view of a yoke of an intermediate shaft in a view in an axial direction.

FIG. 11 is a schematic cross-sectional view of an intermediate shaft according to a third example. FIG. 12 is a side view of a yoke of an intermediate shaft, in a view in the axial direction. The intermediate shaft 27 according to this embodiment includes the upper shaft 27A and the lower shaft 27B. The upper shaft 27A is connected to the output shaft 22B via the universal joint 26 (see FIG. 1). The lower shaft 27B is connected to the pinion shaft 29A of the steering gear mechanism 29 via the universal joint 28 (see FIG. 1). The upper shaft 27A corresponds to one specific example of "a shaft for a steering device" according to the present invention.

As illustrated in FIG. 11, the upper shaft 27A has a yoke 125, a shaft portion 132, a spline shaft portion 133. The yoke 125, the shaft portion 132, and the spline shaft portion 133 are integrated. The yoke 125 is connected to the output shaft 22B via the universal joint 26. The universal joint 26 includes a joint yoke 136 and a spider 138. The yoke 125 includes two arm portions 125a, 125b and a base portion 125c. The arm portions 125a, 125b are connected to the base portion 125c. The arm portions 125a, 125b extend in a direction in parallel with each other in the axial direction, and are provided in a manner facing each other in the direction intersecting with the axial direction. As illustrated in FIG. 12, the base portion 125c has a substantially rectangular shape, and the arm portion 125a is provided one of the two facing sides of the base portion 125c, and the arm portion 125b is provided to the other.

A male spline 135 is provided to the outer circumference of the spline shaft portion 133, and meshed with an outer tube 130 of the lower shaft 27B. The shaft portion 132 is positioned between the yoke 125 and the spline shaft portion 133, and couples the yoke 125 to the spline shaft portion 133. The shaft portion 132 is connected to a surface of the base portion 125c on the opposite side of where the arm portions 125a, 125b are connected.

The lower shaft 27B has the outer tube 130 and a yoke 121. The yoke 121 is connected to the pinion shaft 29A via the universal joint 28. The universal joint 28 includes a joint yoke 137 and a spider 139. The structure of the universal joint 28 is not limited to this example. The outer tube 130 is a hollow tubular member, and is connected to the yoke 121. A female spline 131 is provided to the inner circumference of the outer tube 130, and the male spline 135 of the spline shaft portion 133 is meshed with the female spline 131 of the outer tube 130.

With such a structure, because the upper shaft 27A and the lower shaft 27B are spline-coupled, the intermediate shaft 27 is enabled to communicate the torque of the output shaft 22B, and to move relatively in the directions in parallel with the axial direction. The relative movement of the upper shaft 27A and the lower shaft 27B in the axial direction causes the intermediate shaft 27 to extend and to contract.

Because, in the upper shaft 27A according to this embodiment, the yoke 125, the spline shaft portion 133, and the shaft portion 132 are integrated, the process of joining the yoke 125 and the shaft portion 132 by welding or the like can be omitted, and therefore, the production cost can be reduced.

The outer diameter of the shaft portion 132 is set smaller than the length of the yoke 125 in a direction (second direction) intersecting with the axial direction (first direction), and kept constant across the direction extending along the axial direction. The outer diameter of the shaft portion 132 is set smaller than the length of at least one side of the base portion 125c. Specifically, the outer diameter of the shaft portion 132 is set smaller than the interval between the two sides having the arm portions 125a, 125b included in the base portion 125c illustrated in FIG. 12. Furthermore, the hardness of the shaft portion 132 is set greater than that of the yoke 125, and kept constant across the direction extending along the axial direction, from near the boundary between the shaft portion 132 and the spline shaft portion 133 to near the boundary between the shaft portion 132 and the yoke 125. In this manner, even when a torque equal to or greater than the reference torque is applied, because the shaft portion 132 becomes twisted and goes through a plastic deformation, the impact energy is absorbed by the shaft portion 132. Therefore, the impact energy can be absorbed by the upper shaft 27A appropriately.

A leveled portion 152 is formed between the shaft portion 132 and the yoke 125, and a processed hardened layer 151 is formed on the shaft portion 132 up to near the leveled portion 152 (e.g., the position indicated with a long dashed short dashed line A). Therefore, the hardness of a part of the shaft portion 132 near the leveled portion 152 is greater than the hardness of a part of the yoke 125 near the leveled portion 152. With such a structure, because the hardness of the shaft portion 132 is greater near the leveled portion 152 where the stress concentrates, even when a torque equal to or greater than the reference torque is input, fractures at an early stage can be suppressed.

Explained in this embodiment is a structure in which the upper shaft 27A is connected to the output shaft 22B (see FIG. 1), and the lower shaft 27B is connected to the pinion shaft 29A of the steering gear mechanism 29 (see FIG. 1), but the embodiment is not limited thereto. For example, the upper shaft 27A may be connected to the pinion shaft 29A, and the lower shaft 27B may be connected to the output shaft 22B.

Figure 13:
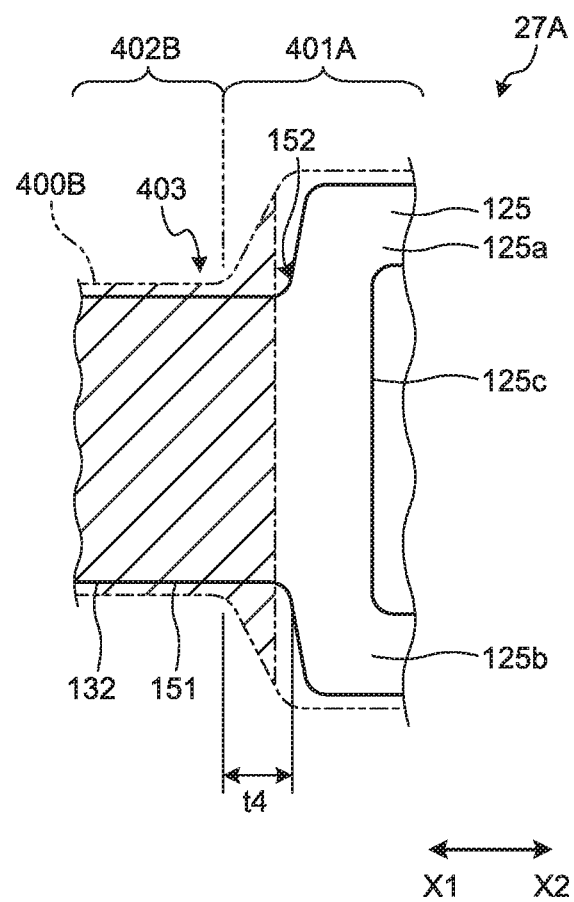
FIG. 13 is a schematic cross-sectional view for explaining a process of machining a leveled portion between a large-diameter portion and a middle shaft portion, in a process of manufacturing an upper shaft according to the third embodiment.

FIG. 13 is a schematic cross-sectional view for explaining the process of machining the leveled portion between the large-diameter portion and the middle shaft portion, in the process of manufacturing the upper shaft according to the third embodiment. For the upper shaft 27A, in the same manner as in the method of manufacturing the torque sensor shaft 23, a forging 400B is first pressed to a shape near the shape of the upper shaft 27A, and the forging 400B is then machined. As illustrated in FIG. 13, the processed hardened layer 151 is formed on a middle shaft portion 402B, and extends further to the portion in the direction X2 than a leveled portion 403 between the middle shaft portion 402B and a large-diameter portion 401A. In FIG. 13, the portion where the processed hardened layer 151 is formed is illustrated as hatched.

The shaft portion 132 is then formed by machining the middle shaft portion 402B. The large-diameter portion 401A is then machined in such a manner that leveled portion 403 is offset by a length t4 in the direction X2. In this manner, the shaft portion 132 with the processed hardened layer 151 is provided near the leveled portion 152 between the shaft portion 132 and the base portion 125c of the yoke 125. Furthermore, a part of the yoke 125 near the leveled portion 152 does not have any remaining processed hardened layer 151. Moreover, by pressing the large-diameter portion 401A of the forging 400B to a shape near the shape of the arm portions 125a, 125b, the time required for machining the arm portions 125a, 125b of the yoke 125 can also be reduced.

Through such a process, the outer diameter of the shaft portion 132 is set smaller than the size of the yoke 125 in the direction intersecting with the axial direction, and kept constant across the direction extending along the axial direction. Furthermore, the hardness of the shaft portion 132 is set greater than that of the yoke 125, and kept constant across the direction extending along the axial direction. Therefore, even when a torque equal to or greater than the reference torque is applied, the shaft portion 132 becomes twisted and goes through a plastic deformation. Therefore, the impact energy is absorbed by the shaft portion 132. In this manner, the impact energy can be appropriately absorbed by the upper shaft 27A, and the torque communication reliability is improved.

The structures of the torque sensor shaft 23 and the upper shaft 27A explained above may be changed as appropriate. These structures of the torque sensor shaft 23 and the upper shaft 27A are presented by way of example only, and the outer diameter, the length, and the like of each shaft portion may be changed as appropriate. The shape and the like of the yoke 125 of the upper shaft 27A may also be changed as appropriate.

REFERENCE SIGNS LIST

10 ECU
21 steering wheel
22 steering shaft
22A input shaft
22B output shaft
22C torsion bar
23, 63, 223 torque sensor shaft
23A, 63A first shaft portion
23B, 63B second shaft portion
23C, 63C third shaft portion 27 intermediate shaft
27A upper shaft
27B lower shaft
29 steering gear mechanism
51, 71, 151, 251 processed hardened layer
52, 72, 152, 252 leveled portion
53 large-diameter portion
54 sensor stopper portion
55 cylindrical portion
63Ca small-diameter portion
63Cb middle-diameter portion
100 electric power steering device
125 yoke
132 shaft portion
200, 200A blank
200B, 400B forging
201A, 401A large-diameter portion
201B stopper
202B, 402B middle shaft portion
203, 403 leveled portion

The invention claimed is:

1. A shaft for a steering device, the shaft comprising:
a first portion;
a second portion; and
a third portion that is integrated with the first portion and the second portion, and that is a shaft coupling the first portion and the second portion in a first direction, wherein
an outer diameter of the third portion is smaller than a length of the second portion in a second direction intersecting with the first direction, and is constant across a direction extending along the first direction,
a hardness of the third portion is greater than a hardness of the second portion, and is constant in the direction extending along the first direction,
the third portion includes a small-diameter portion that is provided on a side of the first portion, and a middle-diameter portion that couples the small-diameter portion and the second portion, and that has an outer diameter smaller than that of the second portion,
an outer diameter of the small-diameter portion is smaller than that of the middle-diameter portion, and is constant in a direction extending along the first direction, and
a hardness of the small-diameter portion is greater than the hardness of the second portion, and is constant in a direction extending along the first direction.

2. The shaft for a steering device according to claim 1, wherein
a leveled portion is provided between the third portion and the second portion, and
the hardness of the third portion near the leveled portion is greater than the hardness of the second portion near the leveled portion.

3. The shaft for a steering device according to claim 1, wherein
the second portion includes a stopper portion that is to be coupled to an output shaft, and a large-diameter portion that is provided between the stopper portion and the third portion and has an outer diameter greater than that of the third portion, and
the hardness of the third portion is greater than a hardness of the large-diameter portion.

4. The shaft for a steering device according to claim 1, wherein
the second portion includes a stopper portion that is to be coupled to an output shaft, and a large-diameter portion that is provided between the stopper portion and the third portion and has an outer diameter greater than that of the third portion, and
the hardness of the small-diameter portion is greater than the hardness of the large-diameter portion.

5. The shaft for a steering device according to claim 1, wherein
the first portion and the second portion are a shaft having a longitudinal direction that extends along the first direction, and
the first portion is to be coupled to an input shaft mounted on a side of a steering wheel.

6. The shaft for a steering device according to claim 1, wherein
the second portion is a yoke that is to be connected to an output shaft or a pinion shaft generating an output torque,
the first portion is a spline shaft portion provided with a spline groove, and
the third portion is a shaft portion that is integrated with the yoke and the spline shaft portion and couples the yoke and the spline shaft portion.

7. An electric power steering device comprising:
the shaft for a steering device according to claim 1;
an output shaft on which a decelerator rotated by a torque input from an electric motor is mounted, the output shaft being coupled to the second portion; and
a torsion bar that couples the output shaft and the shaft for a steering device.

8. A method of manufacturing a shaft for a steering device, the method comprising:
a step of forming a first blank portion and a second blank portion that has a diameter smaller than that of the first blank portion to form a processed hardened layer on the second blank portion, by swaging a material in a radial direction, and
a step of pressing the first blank portion and the second blank portion of the material into a die in the axial direction using a press to integrally form a spline shaft portion, a large-diameter portion, and a middle shaft portion, the spline shaft portion being provided with a spline groove, the large-diameter portion being provided to an end of the material on an opposite side of the spline shaft portion, the middle shaft portion being provided between the spline shaft portion and the large-diameter portion and having an outer diameter being smaller than that of the large-diameter portion and constant in a direction extending along the axial direction, wherein
a small-diameter portion is formed by machining the middle shaft portion, and a middle-diameter portion between the small-diameter portion and the large-diameter portion is formed by machining one end of the large-diameter portion in the axial direction.

9. The method of manufacturing a shaft for a steering device according to claim 8, further comprising a step of machining a leveled portion between the large-diameter portion and the middle shaft portion in the axial direction, while leaving part of the processed hardened layer.

* * * * *